United States Patent
Imai

(10) Patent No.: US 9,280,521 B2
(45) Date of Patent: Mar. 8, 2016

(54) DRAWING SUPPORT APPARATUS, SUPPORTING METHOD AND DRAWING SUPPORT PROGRAM

(71) Applicant: Shoko Imai, Tokyo (JP)

(72) Inventor: Shoko Imai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 366 days.

(21) Appl. No.: 13/796,219

(22) Filed: Mar. 12, 2013

(65) Prior Publication Data

US 2013/0246899 A1 Sep. 19, 2013

(30) Foreign Application Priority Data

Mar. 14, 2012 (JP) ................. 2012-056974

(51) Int. Cl.
*G06F 17/00* (2006.01)
*G06F 17/21* (2006.01)
*G06F 17/30* (2006.01)

(52) U.S. Cl.
CPC .......... *G06F 17/21* (2013.01); *G06F 17/30899* (2013.01)

(58) Field of Classification Search
CPC ................................ G06F 17/30899
See application file for complete search history.

(56) References Cited

U.S. PATENT DOCUMENTS

| | | | | |
|---|---|---|---|---|
| 5,778,372 A * | 7/1998 | Cordell et al. | ......................... | 1/1 |
| 5,897,644 A * | 4/1999 | Nielsen | ......................... | 715/210 |
| 6,230,174 B1 * | 5/2001 | Berger et al. | ................. | 715/201 |
| 6,741,242 B1 * | 5/2004 | Itoh et al. | ...................... | 345/419 |
| 7,171,389 B2 * | 1/2007 | Harrison | ......................... | 705/51 |
| 2001/0007599 A1 * | 7/2001 | Iguchi et al. | ................... | 382/274 |
| 2005/0270305 A1 * | 12/2005 | Rasmussen et al. | ........... | 345/613 |
| 2006/0284867 A1 * | 12/2006 | Ishikawa et al. | ................ | 345/419 |
| 2007/0255811 A1 * | 11/2007 | Pettit et al. | ...................... | 709/220 |
| 2009/0193067 A1 * | 7/2009 | Mathew et al. | ................ | 708/809 |
| 2009/0199081 A1 * | 8/2009 | Arida et al. | ..................... | 715/211 |
| 2010/0037177 A1 * | 2/2010 | Golsorkhi | ....................... | 715/818 |
| 2010/0083146 A1 * | 4/2010 | Hasuike et al. | ................ | 715/760 |
| 2010/0088375 A1 * | 4/2010 | Hirose | ........................... | 709/204 |

FOREIGN PATENT DOCUMENTS

| | | |
|---|---|---|
| JP | H10-243366 A | 9/1998 |
| JP | 2002183034 A | 6/2002 |
| JP | 2002527822 A | 8/2002 |
| JP | 2005122504 A | 5/2005 |
| JP | 2010039815 A | 2/2010 |
| JP | 2011-008622 A | 1/2011 |
| JP | 2011-198238 A | 10/2011 |

OTHER PUBLICATIONS

Japanese Office Action for JP Application No. 2012-056974 mailed on Dec. 1, 2015 with English Translation.

* cited by examiner

*Primary Examiner* — Laurie Ries

(57) ABSTRACT

Disclosed is a drawing support apparatus or the like that realizes a reduction of an execution frequency of a re-drawing processing performed for treating a drawing inconvenience caused by drawing timing in a Web browser.
The drawing support apparatus includes the analysis unit and the calculation unit. The analysis unit calculates a drawing inconvenience occurrence probability, based on a drawing request order information representing a drawing request order given from an out side or an external apparatus which monitors a drawing request for a browser, for each of the drawing request order. And the drawing result indication unit indicates the drawing inconvenience occurrence probability calculated by the analysis unit.

18 Claims, 13 Drawing Sheets

Fig. 4

```
var date=-1;

function init(){
  initContent();
  initDate();
} function initContent(){                    ~ 310
  var div=createDivElement();
  placeDivElement(div);
  var img=createImgElement();
  placeImgElement(img);
}
                                314
function createDivElement(){         ~ 318
  var div=document.createElement("div");  ~ 312
  div.id="divcontent"; ~ 316
  div.innerHTML="web contents";
  return div;
} function placeDivElement(div){                                    ~ 320
  document.getElementsByTagName("body")[0].appendChild(div);
} function createImgElement(){           ~ 322
  var img= document.createElement("img");
  img.id= "imgcontent";
  img.src="someImg.jpg";
  return img;
} function placeImgElement(img){                                    ~ 324
  document.getElementsByTagName("body")[0].appendChild(img);
} function initData(){
  data=0;
} init();
```

Fig. 5

DRAWING REQUEST

| DRAWING OBJECT | EXECUTION BLOCK |
|---|---|
| div#divcontent | create: createDivElement |
| div#divcontent | place: placeDivElement |
| img#imgcontent | create: createImgElement |
| img#imgcontent | place: placeImgElement |

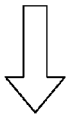

MONITORING RECORD

| DRAWING OBJECT | DRAWING REQUEST ORDER |
|---|---|
| div#divcontent | create: createDivElement → place: placeDivElement |
| img#imgcontent | create: createImgElement → place: placeImgElement |

Fig. 6

| ORDER INFORMATION ID | DRAWING OBJECT | DRAWING REQUEST ORDER | NUMBER OF EXECUTION TIMES | NUMBER OF DRAWING INCONVENIENCE OCCURRENCE TIMES | DRAWING INCONVENIENCE OCCURRENCE PROBABILITY |
|---|---|---|---|---|---|
| 0 | div#divcontent | create: createDivElement → place: placeDivElement | 4 | 1 | 25 |
| 1 | img#imgcontent | create: createImgElement → place: placeImgElement | 2 | 0 | 0 |

Fig. 7

| ORDER INFORMATION ID | DRAWING OBJECT | DRAWING REQUEST ORDER | NUMBER OF EXECUTION TIMES | NUMBER OF DRAWING INCONVENIENCE OCCURRENCE TIMES | DRAWING INCONVENIENCE OCCURRENCE PROBABILITY |
|---|---|---|---|---|---|
| 0 | div#divcontent | create: createDivElement → place: placeDivElement | 5 | 2 | 40 |
| 1 | img#imgcontent | create: createImgElement → place: placeImgElement | 3 | 0 | 0 |

Fig. 8

```
function redrawProbable(prob){
  var random=Math.floor((Math.random()*100)/prob);
  if(random===1){
    redraw();
  }
}
function redraw(){
  //RE-DRAWING PROCESSING
}
```
~ 326

```
var data=-1;
function init(){
  initContent();
  initData();
}
function initContent(){
  var div=createDivElement();
  placeDivElement(div);
  var img=createImgElement();
  placeImgElement(img);
}
function createDivElement(){
  var div=document.createElement("div");
  div.id="divcontent";
  div.innerHTML="web contents";
  return div;
}
```

```
function placeDivElement(div){
  document.getElementsByTagName("body")[0].appendChild(div);
  redrawProbable(40);  ~ 328
}
```
~ 320A

```
function createImgElement(){
  var img= document.createElement("img");
  img.id= "imgcontent";
  img.src="someImg.jpg";
  return img;
}
```

```
function placeImgElement(img){
  document.getElementsByTagName("body")[0].appendChild(img);
  redrawProbable(0);  ~ 330
}
```
~ 324A

```
function initData(){
  data=0;
}
init();
```

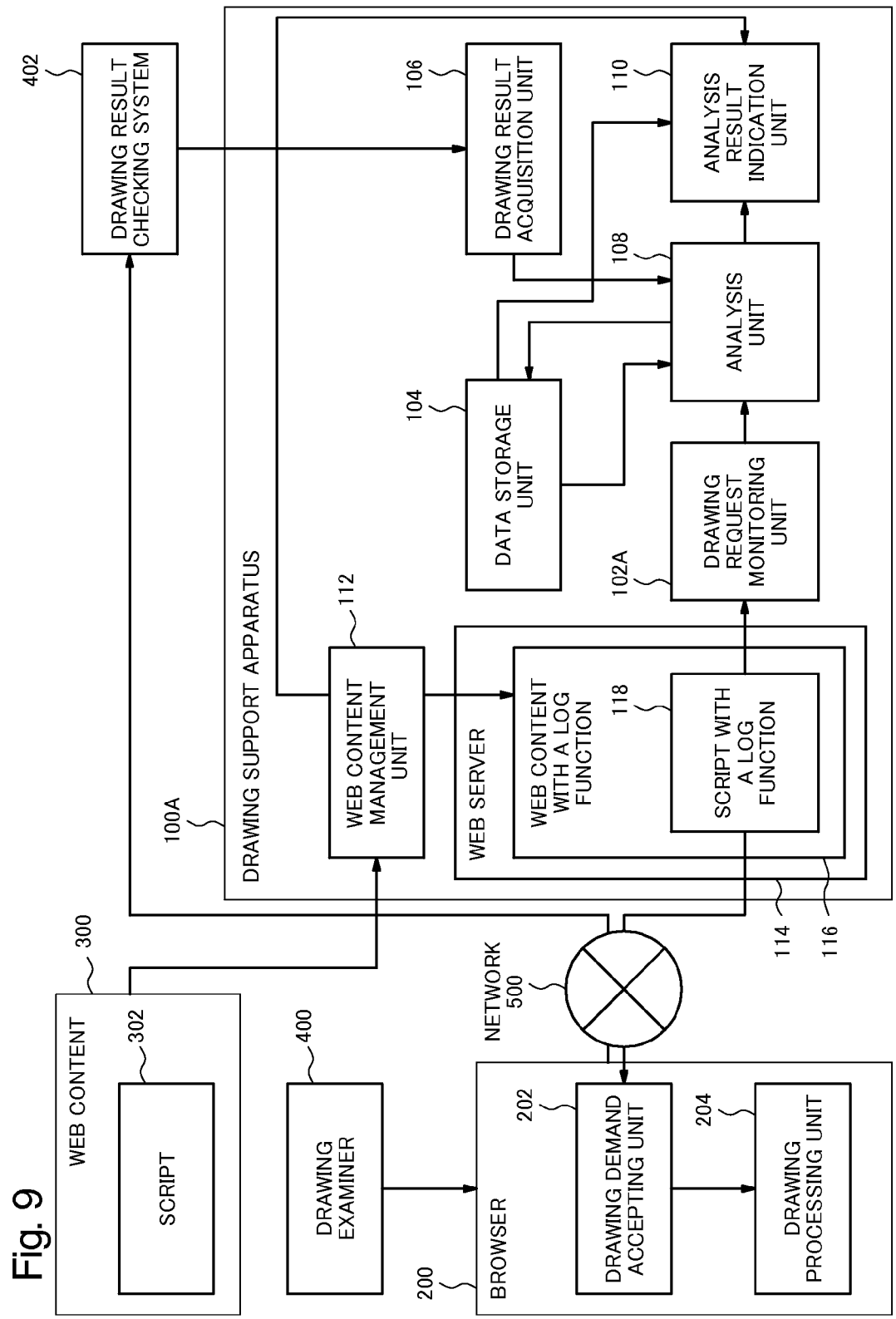

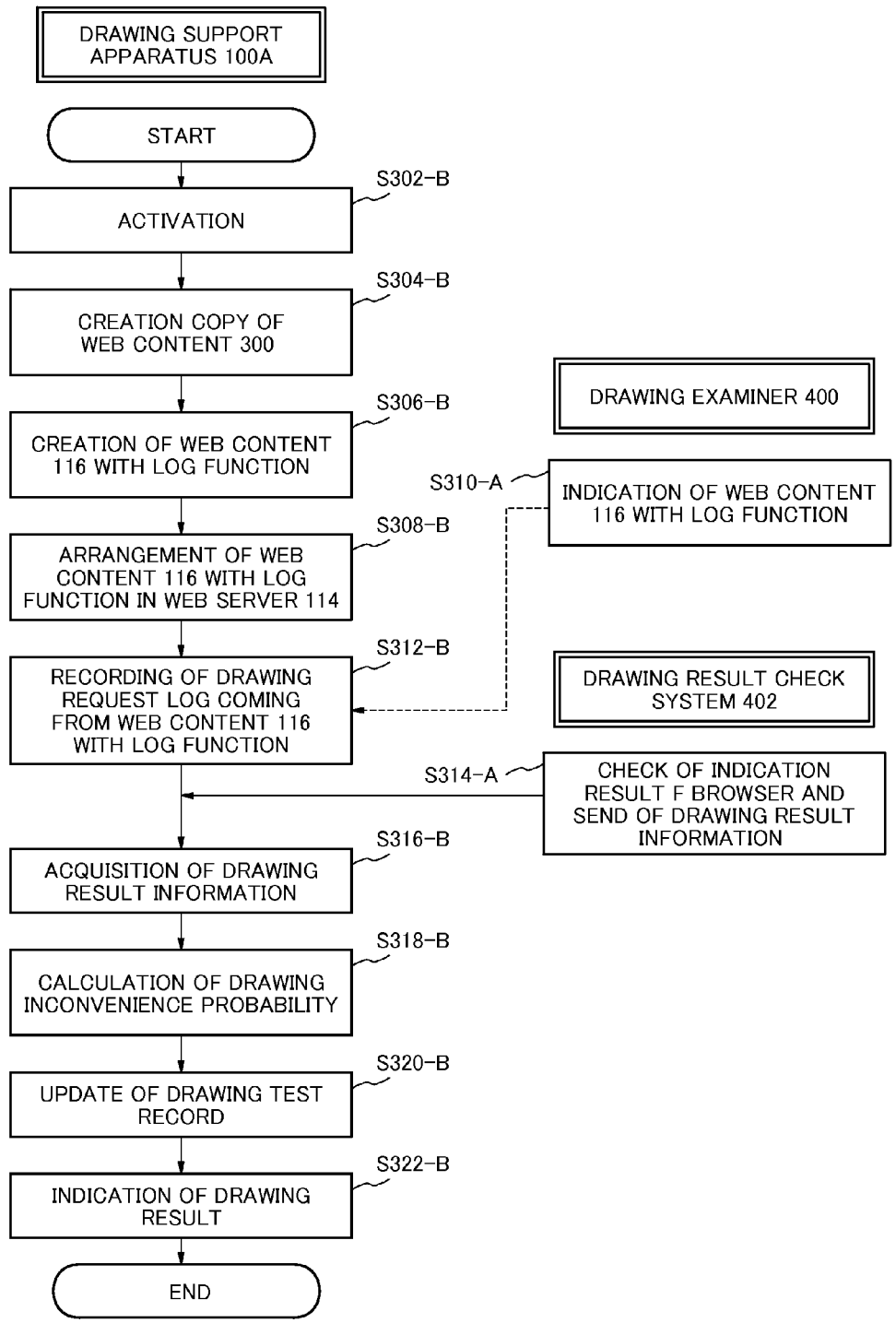

DRAWING SUPPORT APPARATUS, SUPPORTING METHOD AND DRAWING SUPPORT PROGRAM

This application is based upon and claims the benefit of priority from Japanese Patent Application No. 2012-056974, filed on Mar. 14, 2012, the disclosure of which is incorporated herein in its entirety by reference.

TECHNICAL FIELD

For example, the present invention relates to a drawing support apparatus, a drawing supporting method and a drawing support program which are utilized for supporting development of Web content used for the internet or the like. In particular, the present invention relates to a drawing support apparatus, a drawing supporting method and a drawing support program capable of effectively developing the Web content which can avoid occurring defective drawings due to differences between browsers.

BACKGROUND ART

A recent Web content (it may be called as "contents" or "Web content" hereinafter) has advanced in diversification by an evolution of specifications of HTML (HyperText Markup Language) and CSS (Cascading Style Sheets) for creating Web content, and a progress of Web technology.

In many cases, an order of developing the Web content is that the contents are created with a text-base such as the HTML and the CSS, those contents are actually displayed in a screen by a browser (browsing software, hereinafter, it is also called "web browser".), and the display status of the contents is checked.

Various technologies which support developer's works has been proposed so that such contents can be developed efficiently.

As an example of the technology, Patent document 1 (Japanese Patent Application Laid-Open No. 2002-183034) discloses a technology which makes the works easy by supporting operations to perform, by using GUI (Graphical User Interface), a series of the works such as contents creation that have been done by texts and display check Patent document 2 (Japanese Patent Application Laid-Open No. 2005-122504) discloses a technology which supports a checking work of differences between a designing of contents and an actual indication.

Patent document 3 (Japanese Patent Application Laid-Open No. 2002-527822) discloses a technology which supports a test of a Web site whose indication are dynamically changing by a dialogue using a form. More specifically, in technology described in patent document 3, a test configuration file covering the input patterns to the form is created first, and HTTP is transmitted to a Web site instead of a browser. After that, the error included in the HTML will be reported by analyzing the HTML received from the Web site.

However, in development of Web content, it also has to consider that its drawing method and script execution specification are different for each browser which refers to the Web content.

In various browsers, each of the browser is embedded an original drawing engine and script execution engine. That is, the various browsers have the specification peculiar to the browser. Even if a certain browser is expressed to be based on the specification of the CSS, there is a case where indications and operations as described in the specification may not be realized. That is, depending on the kind of the browsers for indications, inconvenience indication and operation (a developer does not intend to) may occur, even if there are no error in HTML.

For example, when an image or the like is shown to the respective browsers between the web browsers whose kinds are different, a subtle difference may occur on a layout. That is, in such a case, it may take place that a drawing position of specific elements (units such as each text and image of the Web content) shifts by several pixels in a browser A and a browser B.

As a technological example which settles the problem, Patent document 4 (Japanese Patent Application Laid-Open No. 2010-39815) discloses technology which automatically corrects an HTML source for an element whose display position and size is shifted, by comparing a display result, by using displayed images, of a browser A and a browser B.

The problem caused by the particular specification of the browser also lies in the point that a specific browser has a restriction in the specification in addition to the indication gap mentioned above. That is, there is a case that the browser doesn't draw an image correctly since the next drawing request has arrived before the drawing processing under the execution has completed depending on the input timing of the drawing processing for the browser. Specifically, when drawing it according to a plurality of drawing requests whose issue timing is different, the drawing inconvenience (inappropriate drawing) takes place such as the phenomenon that the specific element existing in the Web content is not indicated on the browser and the phenomenon that the drawing protrudes out of a designated area on the browser due to that the drawing speed is different.

The drawing inconvenience mentioned above occurs by any one of the drawing request which has been caught up or the next drawing request (which has caught).

The browser correctly indicates all elements if re-drawing is performed since an internal drawing processing of the browser correctly executes the drawing request which has been caught up and the drawing request has caught when a phenomenon occurs that such wrong description takes place.

Accordingly, when a drawing inconvenience problem occurs by such drawing timing, the re-drawing for a display area of the browser should be compulsorily performed after the drawing completion of each drawing object. As a countermeasure to such browser, a Web content developer has added the processing to perform re-drawing in all locations after the drawing processing of the Web content has completed.

SUMMARY

However, the technology mentioned above has a problem that an indication performance substantially degrades owing to increasing a load of a client since it will be the Web content which always executes the re-drawing processing after the drawing request.

In order to settle the problem mentioned above, the main object of the present invention is to provide a drawing support apparatus, a drawing support method and a drawing support program for supporting the Web content development which enables to reduce an execution frequency of a re-drawing processing in a Web browser.

To realize the above-mentioned object, a drawing support apparatus of the present invention includes an analysis unit to calculate a drawing inconvenience occurrence probability, based on a drawing request order information representing a drawing request order given from an out side or an external apparatus which monitors a drawing request for a browser, for each of the drawing request order; and a drawing result indication unit to indicate the drawing inconvenience occurrence probability calculated by the analysis unit.

In another aspect, a drawing support method of the present invention includes calculating a drawing inconvenience occurrence probability, based on a drawing request order information representing a drawing request order given from an out side or an external apparatus which monitors a drawing request for a browser, for each of the drawing request order; and indicating the drawing inconvenience occurrence probability calculated in the calculating.

In a further aspect of the present invention, a non-transitory readable storage medium storing a drawing support program enables a computer to implement an analysis processing to calculate a drawing inconvenience occurrence probability, based on a drawing request order information representing a drawing request order given from an out side or an external apparatus which monitors a drawing request for a browser, for each of the drawing request order; and a drawing result indication processing to indicate the drawing inconvenience occurrence probability calculated by the analysis processing.

According to the present invention, the development and creation of the Web content can be efficiently performed in order to achieve the re-drawing processing that corresponds to difference of a occurrence probability of the drawing inconvenience per an drawing execution order for the Web browser which has a possibility that the drawing request next to the present description processing has caught up.

Other exemplary features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The above and other objects, features and advantages of the present invention will become more apparent from the following detailed description when taken in conjunction with the accompanying drawings characterized in that:

FIG. 4 is a figure which has exemplarily indicated, by JavaScript form, a script 302 included in Web content 300 of a drawing test object in the first exemplary embodiment of the present invention;

FIG. 5 is a figure which has indicated an example of record contents of a drawing request monitoring unit 102 in the first exemplary embodiment of the present invention;

FIG. 6 is a figure which shows an example of the record contents of a data storage unit 104 before the drawing examination execution in the first exemplary embodiment of the present invention;

FIG. 7 is a figure which shows an example of the record contents of a data storage unit 104 after reflecting and updating the drawing test result in the first exemplary embodiment of the present invention;

FIG. 8 is a figure which shows a result which has inserted the description of probabilistic re-drawing processing in a script 302 shown in FIG. 4 in a second exemplary embodiment of the present invention;

FIG. 9 is a block diagram which shows the second exemplary embodiment of the present invention;

FIG. 10 is a flowchart which shows a flow of a drawing test processing in the second exemplary embodiment of the present invention;

EXEMPLARY EMBODIMENT

Next, exemplary embodiments of the present invention will be described in detail with reference to drawings.

Each unit which composes an apparatus or the like according to the each exemplary embodiment described below includes a hardware such as a logic circuit, for example. The apparatus according to the each exemplary embodiment includes a control unit of a computer, a memory, a program loaded in the memory, a storage unit such as a hard disk which is able to store the program, and an interface for connecting with a communication network, etc. The apparatus may be realized by an optional combination of a hardware and a software. A realization method and configuration of an apparatus of the present invention is not limited to the each exemplary embodiment described hereinafter.

Figure 13:
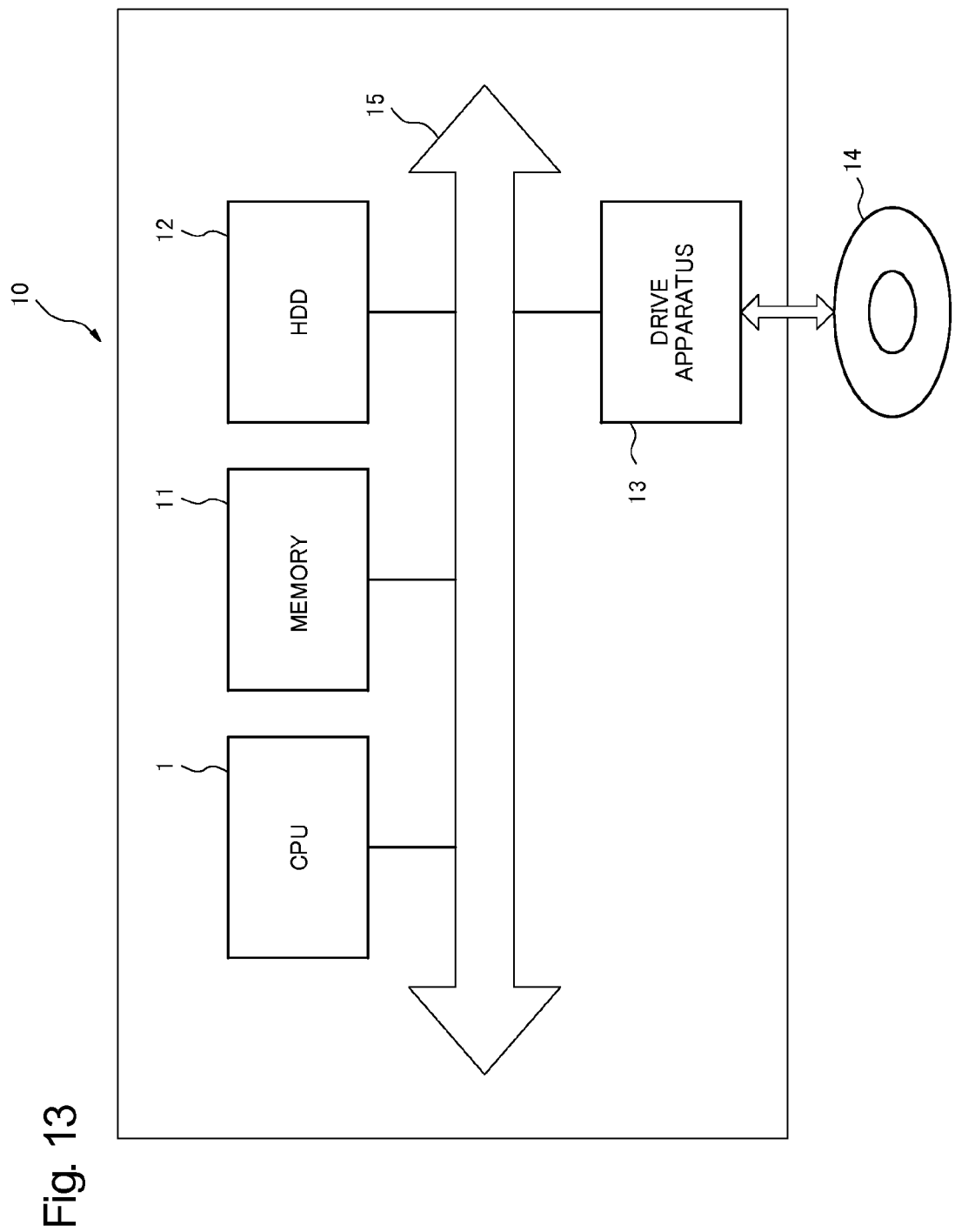
FIG. 13 is a block diagram which shows a hardware configuration of a computer (information processing apparatus) which is able to realize drawing support apparatus (terminal apparatus) in the each exemplary embodiment of the present invention.

FIG. 13 is a block diagram which shows a hardware configuration of a computer (information processing apparatus) which is able to realize a drawing support apparatus (terminal apparatus) in each exemplary embodiment of the present invention. As shown in FIG. 13, the computer 10 including a CPU (Central Processing Unit) 1 etc, controls a whole of the apparatus itself by carrying out OS (Operating System). For example, the CPU 1 reads out a computer program (program) and data from at least any one of a hard disk apparatus (HDD) 12 and a drive apparatus 13 to a memory 11 and carries out the various processing according to the read program and data. For example, the HDD 12 and recording medium 14, which are such as an optical disc, a flexible disc, a magnetic optical disc, an external hard disk and a semiconductor memory, records the computer program readable for the computer. The computer program may be downloaded from an external computer (not illustrated) is connected to a communication network. The computer 10 includes an input/output apparatus (not illustrated) such as a keyboard, a mouse and a display as a user interface. These components are able to communicate each other via a bus 15.

First Exemplary Embodiment

Figure 1:
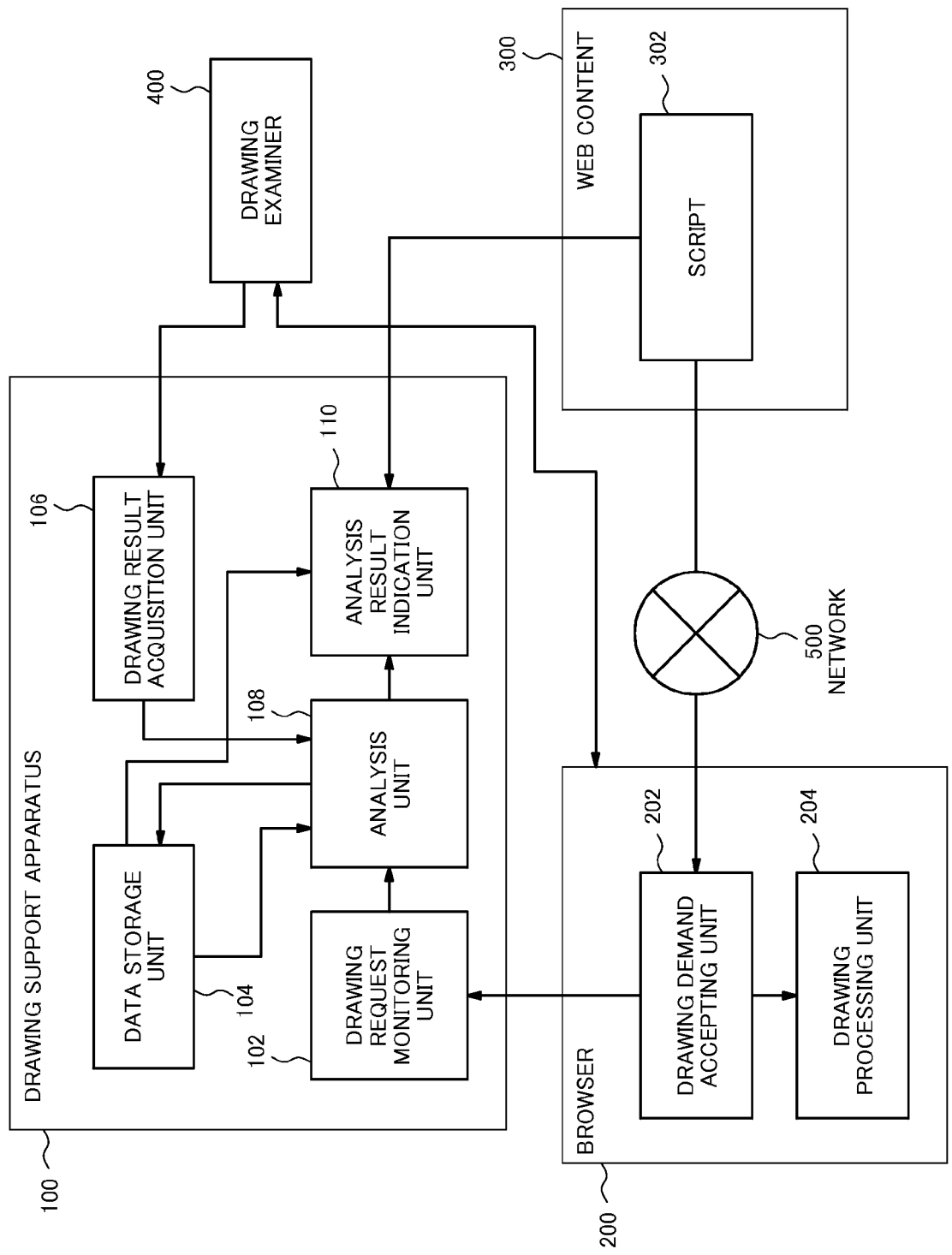
FIG. 1 is a block diagram which shows a first exemplary embodiment of the present invention.

The first exemplary embodiment of the present invention will be described in detail by using the drawings. FIG. 1 is a figure which shows a relation chart of the drawing support apparatus, a browser and Web content of this embodiment. The first exemplary embodiment of the present invention includes a drawing support apparatus 100, a browser 200, Web content 300, a drawing examiner 400 and a network 500.

The browser 200 and the Web content 300 can communicate via a communication network (hereinafter, just referred to as "network") 500 such as the internet and an in-house LAN (local area network).

The drawing support apparatus 100 may include a general information processing apparatus (computer) which operates by program control or may be constructed by an exclusive hardware.

The browser 200 and the Web content 300 may be provided in the drawing support apparatus 100, or it may be provided for other information processing apparatus (computer) or the like.

In this embodiment, a drawing examiner 400 accesses the Web content 300 via the browser 200. The drawing examiner 400 is a user who operates the drawing support apparatus 100 so as to, for example, confirm a drawing result.

The drawing support apparatus 100 is equipped with a drawing request monitoring unit 102, a data storage unit 104, a drawing result acquisition unit 106 that receives the drawing result (drawing result information) from the drawing examiner 400, an analysis unit 108 and an analysis result indication unit 110 which indicates the analysis result by using an updated data stored in the data storage unit 104.

In the drawing support apparatus 100, in order to draw the Web content 300 desired by the drawing examiner 400, the drawing request monitoring unit 102 monitors a drawing request to be sent to the browser 200 and stores an order information of the drawing request.

Specifically, for example, a program which monitors the drawing request with an add-on form or the like is included in the browser 200. A method may be applicable that the program executed in the browser 200 notifies a monitoring result to the monitoring unit 102 by monitoring the drawing request which is carried out for the browser 200 when this program indicates the Web content 300.

The order information on the drawing request may be given to the analysis unit 108 from outside, not generated by monitoring of the drawing request monitoring unit 102

In the drawing support apparatus 100, the data storage unit 104 is able to accumulate drawing test records so far (information regarding to occurrence probability of a drawing inconvenience for each drawing execution order in the past drawing test).

As shown in FIG. 7, the drawing test record gives an order information ID corresponding to each drawing request order in the Web content 300 as a test object. The order information ID is a record of a drawing object, the execution times in the respective drawing request order, occurrence times of the drawing inconvenience (inappropriate drawing) which has occurred in the drawing carried out with the those execution times and the occurrence probability of the drawing inconvenience which is calculated from the occurrence times of the drawing inconvenience for the each respective ID.

In the drawing support apparatus 100, the analysis unit 108 calculates a drawing inconvenience probability for the each drawing execution order by analyzing the various drawing information given from the drawing request monitoring unit 102, the data storage unit 104 and the drawing result acquisition unit 106. And the analysis unit 108 reflects the information on this drawing test in data stored in the data storage unit 104.

Next, the browser 200 is a kind of program having indication functions so that the drawing examiner 400 can browse contents of various Web sites including the Web content 300. As a general function of a browser, the browser 200 has a drawing demand accepting unit 202 and a drawing processing unit 204.

The Web content 300 which is the test object includes a script 302 which performs the drawing request.

Next, an operation of this embodiment having the configuration mentioned above will be described in detail. First, the precondition in this description is described.

FIG. 4 is a diagram which exemplarily describes the script 302 included in the Web content 300 of a drawing test object in this embodiment. The script 302 is described by the JavaScript (registered trademark) form. That is, in this embodiment, the Web content 300 is a Web content based on HTML which carries out the script 302. In the present invention, although HTML and JavaScript are exemplarily applied in this embodiment, the Web content and a description language of the script are not limited to this example.

In this embodiment, terminologies "element", "function" and "block" are used. The "element" is an object operated in the function 314 as exemplarily illustrated by a drawing object element ("div" element) 312. In this embodiment, as illustrated by identification information (the value of the id attribute) 316 of the element, information which identifies the "element" is set to a value of id attribute that has given to the element.

In this embodiment, it is supposed that the value of the id attribute is unique in the Web content 300. The identification information may be other suitable values.

The "function" is API (Application Programming Interface) which performs, for the element as an operation target, various operations such as generation and arrangement as exemplarily illustrated by a function 314.

As illustrated with a createDivElement block 318, the "block" includes zero to a plurality of functions. Generally, although something like the createDivElement block 318 is also called "function" in some cases, for convenience of the explanation, the terminologies which discriminate such "function" and "block" respectively are used in this embodiment.

Here, the drawing object corresponds to the "element" while the identification information on the drawing object corresponds to "the value of the id attribute (of element)". Drawing request order information corresponds to "a block including drawing processing functions" respectively. There are two types of the "function". That is, one type of the "function" generates the drawing request and another type of the "function" is not related to the drawing. In this embodiment, there are four types of the "block" including the drawing processing functions. That is, the four types of the "block" are a createDivElement block 318 to a "div" element, a placeDivElement block 320, a createImgElement block 322 to an "img" element and a placeImgElement block 324.

In the script 302, a block including the drawing processing is called in an order that is indicated in the block 310 which shows a processing flow. That is, the script 302 includes the processing that creates to a "div" element in a createDivElement block 318, places to a body element in a placeDivElement block 320, creates to an "img" element in a createImgElement block 322 and places to a body element in a placeImgElement block 324.

In the following description, it is supposed that the drawing inconvenience has occurred to the "div" element 312 generated in the script 302.

A specific example of the monitoring method by a drawing request monitoring unit 102 is indicated. According to this embodiment, it is supposed that the occurrence of the drawing request creation to the drawing function and its contents are captured by overwriting the added function with a monitoring function to the respective functions that performs the drawing processing. The monitoring function is a function to acquire a request source block of the drawing object and the drawing processing as a monitoring record out of the request contents in a function corresponding to the drawing request. Although only the block which is performing the drawing processing is monitored according to this embodiment, the execution order information and its processing order of the whole of the Web content 300 may be grasped by the monitoring including the block which performs the other processing. Thereby, the precision of the drawing inconvenience probability becomes high that is calculated for each of the drawing request order information, that is, the drawing inconvenience can be analyzed more in detail.

Hereinafter, an operation of the drawing support apparatus 100 in this embodiment will be described with reference to FIG. 2 and FIG. 3.

First, the drawing examiner 400 starts the browser 200. Next, the drawing request monitoring unit 102 in the drawing support system 100 receives the instruction of monitoring start of the drawing request from the drawing examiner 400 (step S102-A shown in FIG. 2). When the instruction of monitoring start of the drawing request are received, the drawing request monitoring unit 102 starts to monitor the drawing request performed to the browser 200 (step S104-B shown in FIG. 2).

Figure 2:
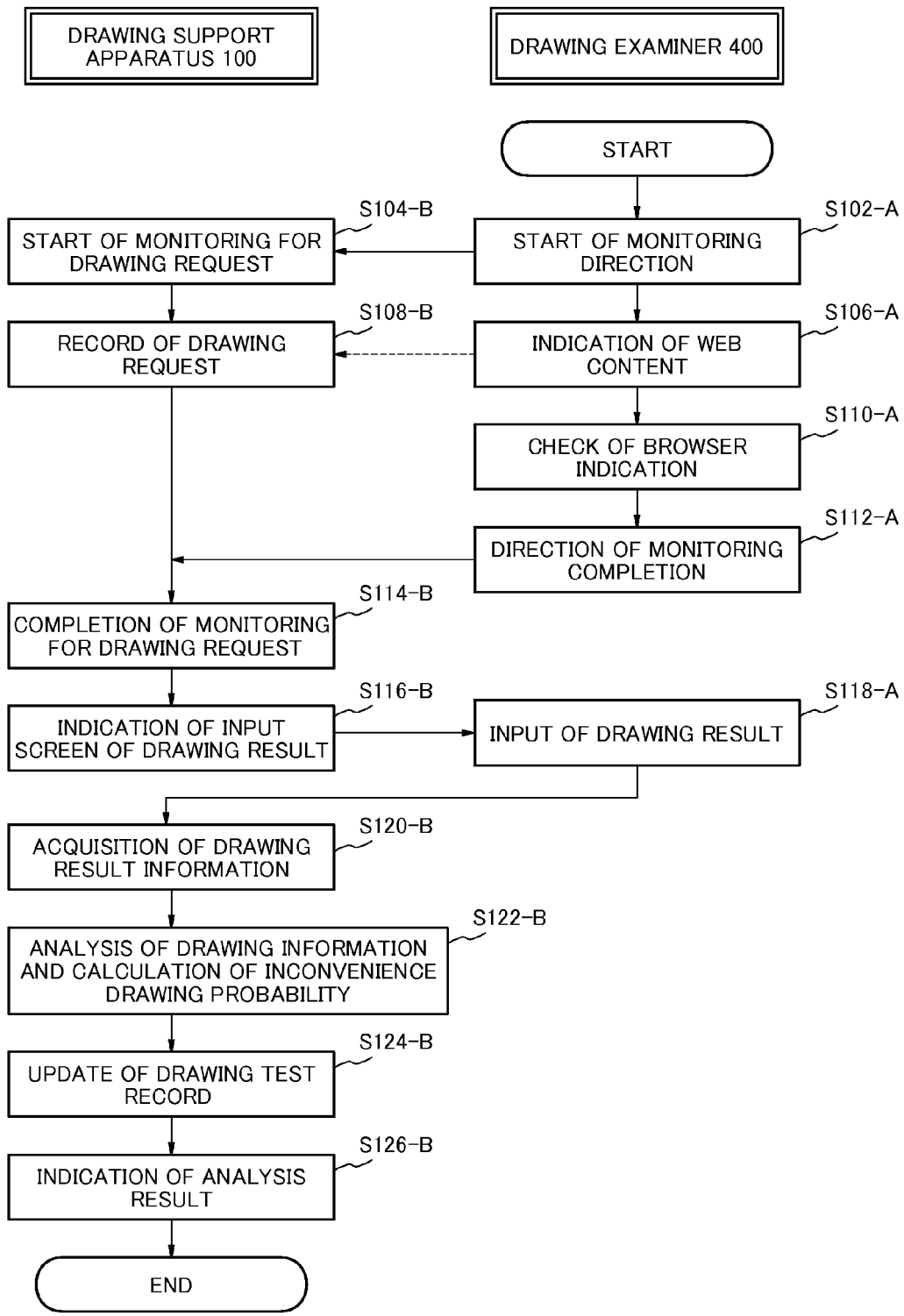
FIG. 2 is a flowchart which shows a flow of a drawing test processing in the first exemplary embodiment of the present invention.

Next, the drawing examiner 400 accesses the Web content 300 which is the test object using the browser 200 (step S106-A shown in FIG. 2).

When the access to the Web content 300 in the browser 200 is detected, the drawing request monitoring unit 102 records a series of the drawing requests performed to the browser 200 from the Web content 300 (step S108-A shown in FIG. 2).

As exemplary illustrated in FIG. 5, contents of the monitoring record which the drawing request monitoring unit 102 records are the object (drawing object) of the drawing request and the order (drawing request order) of the drawing request. Substance (data) of the drawing request order may be applicable to a name or a parameter of the function so that the browser 200 performs the drawing. Substance of the drawing request order may be applicable to a name of the block including the drawing processing. First, according to this embodiment, the drawing request monitoring unit 102 performs the drawing request in the order of the creation to the "div" element in a createDivElement block (318) and the placement in a body element in a placeDivElement block (320). Next, completing of the drawing request is stored as a monitoring record in the order of the creation to the "div" element in a createImgElement block (322) and the placement in a body element in a placeImgElement block (324). Further, it is supposed that execution order information is recorded according to the drawing object.

The drawing examiner 400 checks a display state of the Web content 300 after an indication of the Web content 300 is completed with the browser 200 (step S110-A shown in FIG. 2). That is, the drawing examiner 400 checks a presence of an occurrence of the drawing inconvenience and an object in which the drawing inconvenience has generated when occurring the drawing inconvenience (contents element such as images and sentences which have not been indicated correctly on the browser). In this case, when recognizing that the drawing inconvenience occurred in the "div" element 312 generated in a script 302, a drawing examiner 400 instructs an end of the monitoring in a drawing request monitoring unit 102 (step S112-A shown in FIG. 2).

The drawing request monitoring unit 102 terminates to monitor the drawing request by receiving instructions to finish the monitoring (step S114-B shown in FIG. 2). Next, the drawing result acquisition unit 106 indicates an input screen of the drawing result (step S116-B shown in FIG. 2). That is, presence of the occurrence of the drawing inconvenience and a screen for inputting information (element of the screen and a name of an area) which specifies the object in which the drawing inconvenience has generated (contents element) are indicated to the drawing examiner 400. Further, a plurality of the drawing inconveniences may occur in a drawing test. Therefore, it is supposed that the drawing examiner 400 may be able to input concerning to a plurality of the drawing inconveniences if necessary.

The drawing examiner 400 inputs the drawing result to the screen in which the drawing result acquisition unit 106 has indicated (step S118-A shown in FIG. 2). The information inputted to the drawing result acquisition unit 106 can be considered to be information (the information on the id attribute, for example) specifying the "div" element as an object in which the drawing inconvenience has generated in addition to the information on the occurrence presence of the drawing inconvenience. Here, information representing "the drawing inconvenience has occurred" and the value "divcontent" of the id attribute of the "div" element in which the drawing inconvenience has generated are inputted. And, the drawing result acquisition unit 106 receives the checking result which the drawing examiner 400 has inputted (step S120-B shown in FIG. 2). The judgment and input of the checking result may be able to be automated. In this embodiment, the checking method of the drawing inconvenience is not limited at all.

Next, the analysis unit 108 analyzes the drawing information. The analysis unit 108 acquires the data which becomes the input of the analysis at the beginning of the analysis. First, the drawing test record so far is read from the data storage unit 104 (Step S202 shown in FIG. 3). FIG. 6 is a figure which has conceptually illustrated the drawing test record that the data storage unit 104 holds.

Referring to FIG. 6, it is found that the drawing test of this Web content 300 has executed four times so far, the number of execution times of the "div" element is four and the occurrence of the drawing inconvenience is once. It is also found that the number of execution times of the "img" element is two and the occurrence number of the drawing inconvenience is zero times. Here, because drawing to the "img" element was added to the Web content 300 later, number of runs of the "img" element is something less than number of tests of the Web content. Further, as another adaptation measure to the change the Web content under developing, it may cooperate with a version management system. As a result, even if the change of the script such as the change of the block name takes place, the drawing test record in the past can be utilized.

The information which becomes an input to the analysis unit 108 is the monitoring record (under side of FIG. 5) that the drawing request monitoring unit 102 has recorded and the drawing result information that the drawing result acquisition unit 106 has acquired in addition to the drawing test record (FIG. 6) that the data storage unit 104 has accumulated so far. The information which the drawing request monitoring unit 102 has recorded and the drawing result information which the drawing examiner 400 has inputted are the same as described above.

Next, the analysis unit 108 checks whether or not the drawing inconvenience has occurred in this drawing test. In this embodiment, it is assumed that the drawing inconvenience occurs (Step S204 shown in FIG. 3).

Figure 3:
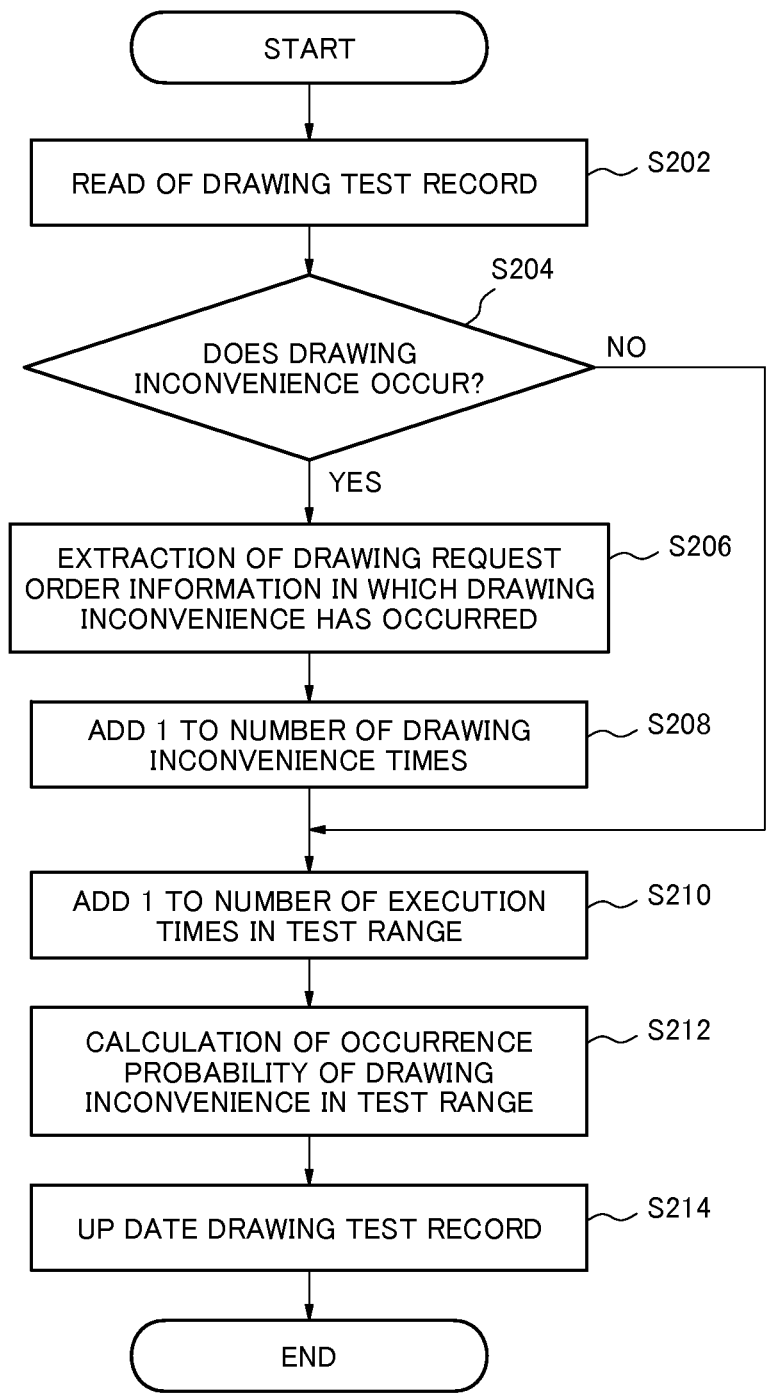
FIG. 3 is a flowchart which shows details of processing in step S122-B and step S124-B in FIG. 2.

Next, when the drawing inconvenience does not occur, processing is advanced to a processing of Step S210 shown in FIG. 3.

When the drawing inconvenience has occurred, the analysis unit 108 extracts all of the identifiers of the drawing inconvenience objects and the drawing request order information on which the objects are operated by using the drawing result information and the monitoring record (Step S206 shown in FIG. 3). That is, first, the analysis unit 108 searches the monitoring records by using a value "divcontent" of the id attribute that is the information specifying occurrence objects of the drawing inconvenience among the drawing result information as a retrieval key. Next, the analysis unit 108 extracts the drawing request order information which makes the element which holds the id attribute as the drawing object. As a result of the search, the drawing request record which has made for "div#divcontent" is extracted, and it can be confirmed that the "div" element operation is performed by the order of the createDivElement block and the placeDivElement block.

And the analysis unit 108 adds 1 to the occurrence times of the drawing inconvenience in the drawing request order information in which the drawing inconvenience has occurred in the drawing test record mentioned above so far by using the extraction result. That is, one is added to the occurrence times of the drawing inconvenience in the order information on the createDivElement block and the placeDivElement block to the "div" element which has become inconvenient (Step S208 shown in FIG. 3).

Next, the analysis unit 108 adds 1 to the number of the execution times of the order information concerning to all of the drawing request orders included in the monitoring record mentioned above. That is, the analysis unit 108 adds 1 to the number of the execution times in the sum of two of the order in formations of the order of the createDivElement block→placeDivElement block to the "div" element and the order of the createImgElement block→placeImgElement block to the "img" element (Step S210 shown in FIG. 3).

In this case, when there are a drawing object and a drawing request order which are not included in a drawing test record, the analysis unit 108 adds the drawing test record as a new item.

After that, the analysis unit 108 calculates the occurrence probability of the drawing inconvenience in all of the drawing request order information in which the number of the execution times is updated or added. That is, in two of the order in formations in which the number of the execution times has been updated, the occurrence probability of the drawing inconvenience is calculated (Step S212 shown in FIG. 3).

In this embodiment, it is supposed that the occurrence probability expresses a value given by dividing number of occurrence times of the drawing inconvenience by number of the execution times in percent (%). And, as the end of the analysis, the analysis unit 108 updates the number of the execution times of all of the order information, the number of the occurrence times of the drawing inconvenience and the occurrence probability of drawing inconvenience (step S124-B shown in FIG. 2 and Step S214 shown in FIG. 3), which are carried out this time to the data storage unit 104. The drawing test record after the update of the number of the execution times, the number of the occurrence times of the drawing inconvenience and the occurrence probability of the drawing inconvenience is illustrated conceptually in FIG. 7.

As the execution result of the drawing test performed this time, the drawing test record to the "div" element will be five execution times, twice of the drawing inconvenience occurrence and the 40% of the occurrence probability of the drawing inconvenience while the drawing test record to the "img" element will be three execution times, zero times of the drawing inconvenience occurrence and the 0% of the occurrence probability of the drawing inconvenience.

After the analysis by the analysis unit 108, the analysis result indication unit 110 shows the analysis result to the drawing examiner 400 by using the monitoring record of the drawing request monitoring unit 102 and the latest drawing test record of the data storage unit 104 (step S126-B shown in FIG. 2). First, the analysis result indication unit 110 digs the drawing object and the drawing request order included in this drawing test range from the monitoring record. Next, the record of this drawing test range is shown by extracting from the drawing test record. That is, the drawing inconvenience probability in the drawing order of the createDivElement block→placeDivElement block to div#divcontent is 40% in the shown contents. And the information is included which shows that the drawing inconvenience probability in the drawing order of the createImgElement block to img#imgcontent→the placeImgElement block is 0%.

The analysis result indication unit 110 shows the analysis result such as each drawing request order information carried out at this the drawing test and a list of the occurrence probability of the drawing inconvenience.

The analysis result indication unit 110 may automatically create, by giving the script 302 included in the Web content 300 to the result of the analysis result indication unit 110, a script which is inserted the description for a probabilistic re-drawing processing as a coping strategy of the drawing inconvenience.

Since the probabilistic re-drawing processing described here is a processing to perform the re-drawing with the proportion according to the drawing inconvenience probability that is given as an argument, it is for avoiding the drawing inconvenience. A place (location) where the probabilistic re-drawing processing is inserted is a processing part of the end of drawing request order in the range carried out by this drawing test described above. As this result, it is the processing to finally avoid the drawing inconvenience by completing the execution of a series of the drawing requests and performing the re-drawing corresponding to the degree of the occurrence probability of the drawing inconvenience at the timing after the occurrence of the drawing inconvenience.

In the probabilistic re-drawing processing which the analysis result indication unit 110 inserts, the probability that re-drawing is performed may be the same as the drawing inconvenience probability. The threshold value is set up for the occurrence probability of the drawing inconvenience. If the drawing inconvenience probability is no more than the threshold value, the analysis result indication unit 110 may not insert the description of the probabilistic re-drawing. Or, by the internal control of the probabilistic re-drawing processing, if the drawing inconvenience probability that is given by an argument is no larger than the threshold value, the re-drawing processing may not be performed.

When the occurrence probability of the drawing inconvenience is the drawing inconvenience probability which is not smaller than the threshold value on the one hand, the analysis result indication unit 110 may insert a processing to perform 100% certainly the re-drawing to all of the drawing request order. Or, by the internal control of the probabilistic re-drawing processing, if the drawing inconvenience probability that is given by an argument is no smaller than the threshold value, the re-drawing processing may be always performed. That is, the execution probability of the re-drawing processing that the analysis result indication unit 110 inserts may not be same as the drawing inconvenience probability in the drawing request order.

An operation of the analysis result indication unit 110 will be described below in detail concerning to a specific example of the script auto-creation with reference to FIG. 4 and FIG. 8. In this embodiment, FIG. 8 is a figure exemplarily indicating a result which has inserted the description of the probabilistic re-drawing processing in the script 302 shown in FIG. 4.

First, the analysis result indication unit 110 analyzes the drawing request order of the analysis result mentioned above and determines the place where the description of the probabilistic re-drawing processing is inserted. The place where the description of the probabilistic re-drawing processing is inserted is a processing part of the end of the drawing request order in the range carried out by this drawing test. That is, they are two places which is the placeDivElement block 320 (FIG. 4) to div#divcontent and the placeImgElement block 324 (FIG. 4) to img#imgcontent.

Next, the analysis result indication unit 110 inserts a processing which probabilistically performs the re-drawing in the form shown in FIG. 8, for example for two locations which are the places where the script 302 (FIG. 4) is read in and the description of the probabilistic re-drawing processing. That is, the processing is inserted to hand a probability to an argument in the end of each execution order and call this block. According to this embodiment, the description of the inserted probabilistic re-drawing is the probabilistic re-drawing processing 40% (328 shown in FIG. 8) in the placeDivElement block 320A (FIG. 8) to div#divcontent, the probabilistic re-drawing processing 0% (330 shown in FIG. 8) in the placeImgElement block 324A (FIG. 8) to img#imgcontent and the probabilistic re-drawing processing body 326 (FIG. 8).

For example, as a method by which the analysis result indication unit 110 acquires the script 302, the script 302 is stored as a text file at the place where it can be read out from the environment that the drawing support system 100 works. Next, it is considered that the drawing examiner 400 inputs the file location in step S118-A when the drawing result is input.

Further, in this embodiment, it is supposed that the probabilistic re-drawing body is the redrawProbable block 326 (FIG. 8), and the analysis result indication unit 110 is equipped with in advance. Further, the analysis result indication unit 110 may read the probabilistic re-drawing processing body from the file given from the outside as the same as the script 302. The allocating place in the script of the probabilistic re-drawing processing body (326 shown in FIG. 8) is set as the head of the whole script in this embodiment. However, it is arranged in the location specified by the rule according to a description rule of the script language if the description rule of the script language is different.

A numerical number 40 which is an argument in the parenthesis of probabilistic re-drawing 40% (328 shown in FIG. 8) and a numerical number 0 which is an argument in the parenthesis of probabilistic re-drawing 0% (330 shown in FIG. 8) correspond to the drawing inconvenience occurrence probability of in the respective drawing request order. According to the probability given by an argument, the probabilistic re-drawing processing performs the re-drawing processing. In the probabilistic re-drawing processing body (326 shown in FIG. 8) of this embodiment, the numerical value of the argument is set to be the probability (percent (%)) of the re-drawing processing with no modification. For example, the probabilistic re-drawing processing 40% (328 shown in FIG. 8) performs the re-drawing at the rate of 4 times out of 10 times drawings. Accordingly, because the drawing inconvenience of the "div" element occurs by 40%, and the 40% out of it is normally recovered by the re-drawing, the final drawing inconvenience occurrence probability will be 16%.

And finally, the analysis result indication unit 110 shows the script (FIG. 8) created automatically to the drawing examiner 400 by the method of a screen indication, a printing and the file output. Further, based on the analysis result such as the respective request order information executed in this drawing test and the creation probability of the drawing inconvenience for the respective drawing request order, both or anyone of the scripts of FIG. 8.

Thus, the drawing support apparatus 100 can indicate in which part of the Web content 300 and how high the occurrence probability of the drawing inconvenience is to the drawing examiner 400. Because the avoidance plan to the drawing inconvenience can be shown to a developer of the Web content by the function of the auto-creation of the script (FIG. 8), the processing which performs the re-drawing according to the probability in the proper location of the script 302 in the Web content 300 can be embedded easily.

For example, in general, by the characteristic of the web browser, it is supposed that the drawing inconvenience may occur to drawing which is being processed at present due to the cause that the next drawing request catches up to the present drawing processing under running. In that case, in the avoidance method that the processing is embedded to perform the re-drawing in all blocks including the drawing of the Web content, totally four times re-drawings in blocks 318, 320 and 322 and 324 will be always performed. Or, totally twice of the re-drawing may be always performed at the two locations by digging that the blocks to which the drawing processing does not succeed are only the blocks 320 and 324 of FIG. 4 with the effort to analyze and verify the order of the drawing processing.

According to this embodiment, the re-drawing processing should be performed to only the placeDivElement block 320 (FIG. 4) and the placeImgElement block 324 (FIG. 4) of the end of the drawing order for each drawing object shown to this example. According to this embodiment, it can be easily handled by embedding the processing (326, 328 and 330 shown in FIG. 8) in which the number of the re-drawing times corresponding to the drawing inconvenience probability of 40% and 0% respectively according to the shown script 302 (FIG. 8) is subtracted.

As described above, it can avoid the development and the creation of the contents so as to generate the drawing inconvenience due to that the next drawing request catches up the drawing processing under running at present in the Web browser in this embodiment. This embodiment has an effect that the development and the creation of the Web content can be performed which can reduce the occurrence frequency of the re-drawing processing in the web browser.

It is a reason that the analysis result indication unit 110 shows the occurrence probability of the drawing inconvenience for each drawing execution order until the present and the identification information of the drawing request objects to a developer of the Web content. As a result, because the developer can obtain the combination of the information (the drawing request object identification information and the drawing execution order) on the location in which the drawing inconvenience generates and the occurrence probability of the drawing incontinence, the processing can be embedded which performs the re-drawing corresponding to the occurrence probability of the drawing inconvenience after the final drawing request processing of the drawing execution order in the Web content.

Second Exemplary Embodiment

Next, the second exemplary embodiment based on the first exemplary embodiment mentioned above will be described. In below, a characteristic part according to this embodiment will be described in main. In other words, the same reference code as the reference code attached in the first embodiment is attached in the composition component of the second exemplary embodiment which has the same composition component of the first exemplary embodiment and the duplicated detail description concerning to the composition component is omitted.

FIG. 9 is a block diagram which shows the second exemplary embodiment of the present invention.

As shown in FIG. 9, the second exemplary embodiment of the present invention includes a drawing support apparatus 100A, a browser 200, the Web content 300, a drawing examiner 400, a drawing result checking system 402 and a network 500.

In FIG. 9, the drawing support system 100A may include a general information processing apparatus (computer) which operates by the program control and the exclusive hardware may be included.

The drawing support apparatus 100A further includes a Web content management unit 112, a Web server 114, Web content 116 with a log function and a script 118 with a log function in addition to the composition of the drawing support apparatus 100 in the first exemplary embodiment shown in FIG. 1. The drawing support apparatus 100A has a drawing request monitoring unit 102A in which a part of the functions are different instead of the drawing request monitoring unit 102 in the first exemplary embodiment. The drawing support apparatus 100A and the browser 200 can communicate via the communication network (hereinafter, just referred to as "network") 500 such as the internet and an in-house LAN (local area network).

In this embodiment, the Web content management unit 112, the Web server 114, the Web content 116 with a log function, the script 118 with a log function and the drawing request monitoring unit 102A are mainly implemented in order to monitor the drawing request with the form (independent from a browser) other than the method which directly acts on the browser such as the add-on to the browser.

That is, the Web content management unit 112, the Web server 114 and the Web content 116 with a log function and the script 118 with log function realize the function to add a system to monitor a drawing request on the Web content 300 and the script 302. Accordingly, in this embodiment, the browser 200 accesses the Web content 116 with a log function via the Web server 114 of the drawing support apparatus 100A instead of the Web content 300.

The Web content management unit 112 acquires the Web content 300 and the script 302 based on the information given from outside and holds the copy inside. The management unit 112 creates the Web content 116 with the log function and the script 118 with the log function in which the log function to monitor the drawing is added to the Web content 300 and script 302.

Responding to an access request from the browser 200, the Web server 114 transmits the Web content 116 with the log function and the script 118 with the log function that the Web content management unit 112 has created to the browser 200.

The Web content 116 with the log function and the script 118 with the log function are created by the Web content management unit 112. And when the drawing request is performed in the browser 200, the Web content 116 with the log function and the script 118 with the log function have the log function that the browser 200 sends a log which includes the drawing request information to the drawing support apparatus 100A.

When the browser 200 indicates the Web content 116 with the log function, the drawing request monitoring unit 102A receives the sent log and stores it as the monitoring record of the drawing request.

According to this embodiment, the drawing result check system 402 automatically checks the drawing result of the browser 200 as an example which shows the realization diversity of the system configuration.

The drawing result checking system 402 acquires a drawing result with reference to the browser 200 instead of the drawing examiner 400 in the first exemplary embodiment mentioned above. That is, the system 402 checks the occurrence presence of the drawing inconvenience automatically and inputs to the analysis acquisition unit 106. Further, the drawing result checking system 402 is independent from the browser mentioned above and does not relates to the function to monitor the drawing request.

Next, the operation of this embodiment having the constitution mentioned above will be described in detail.

FIG. 10 is a flow chart which shows a flow of the drawing test processing by the drawing support apparatus 100A and the drawing examiner 400 according to the second exemplary embodiment of the present invention.

In the following description, the operations such as the acquisition to the script 302 and the script 118 with the log function, the copy creation and addition of the log function are described with including in the operations for the Web content 300 and the Web content 116 with the log function which includes them. In particular, the script 302 and the script 118 with the log function may not be described as the objects.

For example, when "The Web content 116 with a log function is created with the addition of the log function to the Web content 300" is described, the log function is also given to the included script 302, and it means that the script 118 with the log function is also created.

First, the drawing support apparatus 100A is started by inputting the information for the acquisition of the Web content 300 which becomes the drawing test object (step S302-B). For example, the drawing examiner 400 starts by the command-input of the path information which indicates the position of the Web content 300 as an argument from the console (not illustrated).

Or the drawing support apparatus 100A may be composed so that the automatic activation can be performed at the time of the machine starting.

When the drawing support apparatus 100A starts, the Web content management unit 112 acquires the Web content 300 designated by an argument, creates the copy and holds it inside (step S304-B). And the management unit 112 creates the Web content 116 with the log function which is given the log function that realizes the monitoring of the drawing request in the acquired the Web content 300 (step S306-B).

Here, the log function is the function that the browser 200 sends the contents of the drawing request to the drawing request monitoring unit 102A at the timing when the drawing request is performed, when the Web content 116 with the log function is indicated in the browser 200.

Or in order to reduce the number of telecommunication times between the browser 200 and the drawing request monitoring unit 102A, the log concerning to all the drawing request contents may be transmitted together after the indication completion of the whole of the Web content 116 with the log function not at the timing that the drawing request has been performed as mentioned above.

For example, the substance of the script 118 with the log function is created by a method to insert after the drawing processing of the script 302 to the description of the processing of the log function mentioned above in the JavaScript form. The add-on of the log function may be realized by other methods.

And, the Web content management unit 112 arranges the Web content 116 with the created log function in the Web server 114 (step S308-B).

Next, the drawing examiner 400 accesses the Web server 114 via the browser 200 and indicates the Web content 116 with the log function (step S312-A). Corresponding to this, by the log function embedded in the Web content 116 with the log function, the drawing request monitoring unit 102A receives the log of the drawing request from the browser 200 and records as the monitoring record of the drawing request (step S310-B). Here, as shown in FIG. 5, the contents (monitoring record) that the drawing request monitoring unit 102A records are the same information as the first exemplary embodiment mentioned above.

After indication of the Web content 116 with a log function is completed on the browser 200, the drawing result checking system 402 acquires the drawing result with reference to the browser 200 and sends the drawing result to the drawing result acquisition unit 106 (step S314-A).

The various forms are considered as a means for checking the drawing results. For example, when the technology disclosed by the patent document 2 is used, the check of the drawing result can be realized by the various methods such as the comparison of the image of the indication area of the browser after the indication and the image of the indication area of the browser 200 at the time of the normal drawing and the specification of the components existing at the position after the part which includes the difference is detected.

Similarly, the various methods can be considered as a method to learn that the indication of the Web content 116 with the log function has been completed in the browser 200. For example, the method may direct the start of the result checking to the drawing result checking system 402 by the drawing examiner 400. Or the drawing result checking system 402 may be applicable to always watch the browser 200 and detect the indication completion automatically.

The drawing result acquisition unit 106 acquires the drawing result from the drawing result checking system 402 (step S316-B). While the drawing result acquisition unit 106 has indicated the input screen of the drawing result in the first exemplary embodiment mentioned above, the acquisition processing of the drawing result starts by receiving from the drawing result checking system 402 in this embodiment.

The contents of the drawing result which the drawing result acquisition unit 106 acquires from the drawing result checking system 402 are similar to what the drawing examiner 400 has inputted in the first exemplary embodiment mentioned above. That is, the contents of the drawing result include the information (element of the screen and the name of the area) which specifies the presence of the drawing inconvenience occurrence and the objects in which the drawing inconvenience has generated.

Next, the analysis unit 108 analyzes the drawing information (step S318-B). Because it is the same as that of the first exemplary embodiment mentioned above concerning to the analysis operation that the analysis unit 108 performs, the description in details will be omitted.

The analysis unit 108 updates the drawing examination result information which the data storage unit 104 holds in the occurrence probability of the drawing inconvenience which is this analysis result after the analysis (step S320-B).

Finally, the analysis result indication unit 110 shows the drawing test result based on the monitoring record of the drawing request monitoring unit 102A and the latest drawing test record of the data storage unit 104 (step S322-B).

Because it is the same as that of the first exemplary embodiment mentioned above concerning to the indication operation of the analysis result of the drawing information, the description in details will be omitted. However, the analysis result indication unit 110 performs the embedding processing based on the copy of the script 302 which the Web content management unit 112 holds when the script which inserts the description of the probabilistic re-drawing in the script 302 is automatically created and indicated.

In the same way as the first exemplary embodiment mentioned above, this embodiment has the effect that the avoidance plan of the drawing inconvenience can be indicated by the auto-creation function of the script (FIG. 8) in addition to that which part in the Web content 300 and how high the occurrence probability of the drawing inconvenience can be indicated to the drawing examiner 400.

Moreover, by including the Web server 114, this embodiment enables to make what embeds the log function in the Web content which is the object the monitoring object. In that case, according to this embodiment, the effect is obtained that the function of the drawing support system 100A can be realized independent from the kind of the browser 200. That is, the drawing test to a plurality of browsers can be carried out using one drawing support apparatus 100A because the drawing support apparatus 100A is not built for each kind of the browsers. As a result, the load of a Web content developer can be reduced concerning to the drawing test in the Web content development which supports the indication in a plurality of browsers and its handling work.

According to this embodiment, because the drawing check at the time of the indication completion of the browser 200 can be automated using the drawing result checking system 402, as a result, there is an effect that the work of the drawing examiner 400 can be reduced.

Third Exemplary Embodiment

Next, the third exemplary embodiment based on the first and the second exemplary embodiments mentioned above will be described. In the below, the characteristic part according to this embodiment will be described in main. The same reference codes as the reference codes attached to the first and the second exemplary embodiments for the construction components of the third exemplary embodiment which has the similar construction to the first and the second exemplary embodiments, and the duplicated detailed description is omitted concerning to the construction components.

According to this embodiment, first, the attached information other than the drawing request order information is added to the monitoring record. Next, the case of the classification per the class (henceforth, referred to as "case") which adds the attached information to the drawing request order information at the time of analyzing the drawing inconvenience generation probability is described. That is, the processing order information of the drawing request is classified by tying together into a case in which the same processing feature has the same tendency.

The system configuration in this embodiment and the flow of the whole processing are the same as that of the first exemplary embodiment mentioned above (refer to FIG. 1 and FIG. 2 respectively). However, as described below, the composition of the analysis processing of the drawing inconvenience probability realized by the drawing request monitoring unit 102, the data storage unit 104 and the analysis unit 108 is different.

In addition to the monitoring information in the first exemplary embodiment, the drawing request monitoring unit 102 records the calling history of the all blocks other than the drawing processing, the control information that influences affects the block actions such as the synchronization/asynchronization at the execution time of each block and the additional information such as the operating environment.

The data storage unit 104 records the drawing object, the number of execution times not for each drawing request order information but for each case, the number of the occurrence times and the record of the occurrence probability of the drawing inconvenience. The contrast information which shows the drawing request order information and the drawing object has been classified into is accumulated. The contrast information of the case is used when the place (location) is specified where the analysis result indication unit 110 inserts the description of the probabilistic re-drawing processing in the script 30.

The analysis unit 108 calculates the drawing inconvenience of the occurrence probability for each case, not the drawing request order information.

The operation of this embodiment will be described with reference to FIG. 2 and FIG. 11 below.

Figure 11:
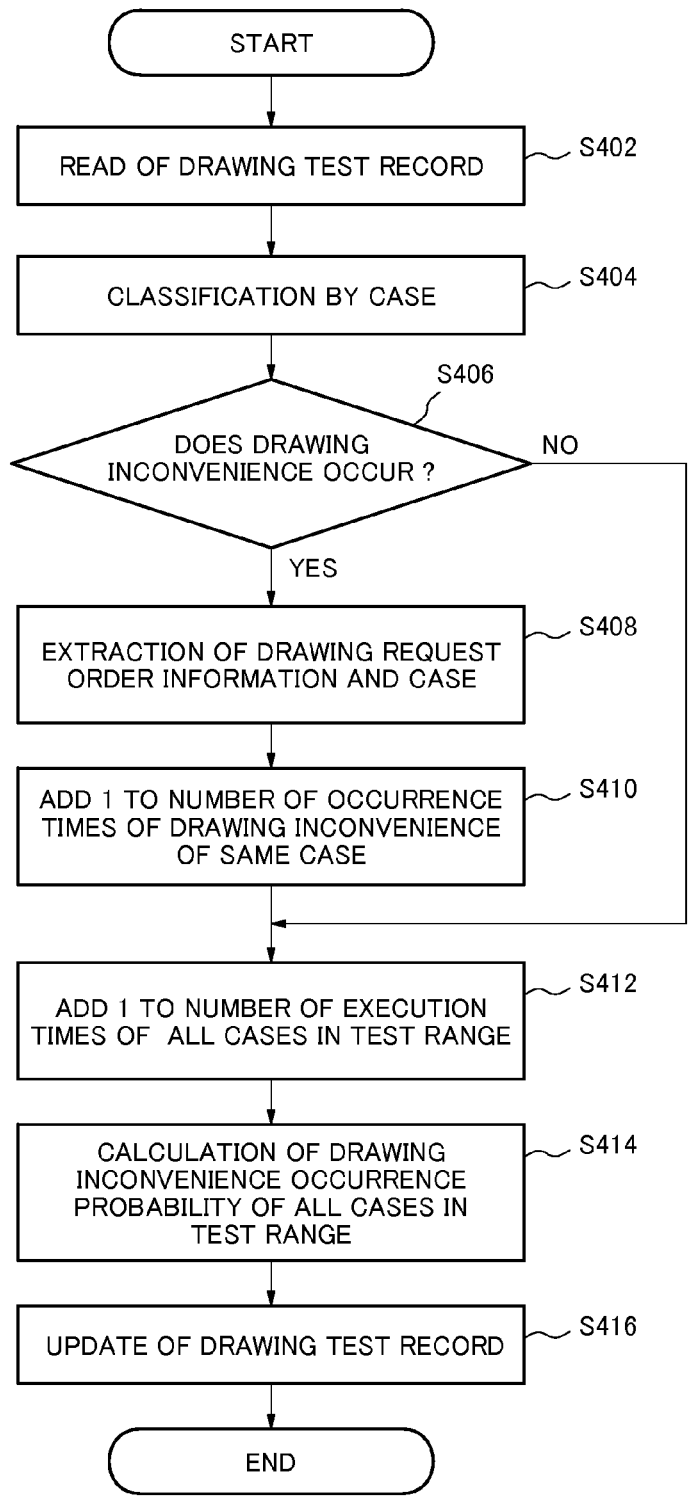
FIG. 11 is a flowchart which shows the details of processing performed by step S122-B and step S124-B shown in FIG. 2 in a third exemplary embodiment of the present invention.

FIG. 11 is a flowchart which shows in detail what kind of processing the step S122-B and the step S124-B shown in FIG. 2 will be in this embodiment.

First, an operation until the drawing examiner 400 accesses the Web content 300, and the operation until the drawing request monitoring unit 102 monitors the drawing request, are the same as those of the first exemplary embodiment mentioned above. Here, the operation (step S108-B of FIG. 2) in which the drawing request monitoring unit 102 records the drawing request will be described first.

The drawing request monitoring unit 102 monitors the calling history of all the blocks other than the drawing processing, the control information which influences the operation in a block such as synchronization/asynchronization at the execution time of each block and the additional information on the operating environment and records with the drawing request order information.

Here, the synchronization/asynchronization at the execution time of each block is the operation mode designation which designates whether it waits the completion of the other processing during the execution of the processing of the block mentioned above and the function mentioned above. For example, the respective operation modes are switched by the execution of the function that sets the synchronization at the execution time of each block and the execution of the function that sets the asynchronization. The kind of the control setting of such operation mode and the setting method depend on the specification of the description language of the Web content. For example, the operating environment is the value of the CPU utilization rate and the network utilization rate of the computer in which the browser 200 is operating. Concerning to the kind and the contents of the additional information, it is not limited to these.

The drawing request monitoring unit 102 also classifies and records the contents of each drawing request. As the contents of the drawing request, for example, the kind and the value of the attached attributes such as the kind of the operations, the style attributes and the class attributes such as the creation of the element, a change of the attribute, a change of a drawing style (including the style attribute and the class attribute), arrangement of the element and the cancellation of the element can be considered.

Further, for example, after a mapping table of the operation and the attribute type to a block name and a function name is held in advance, and the drawing request monitoring unit 102 may be operated so that it may distinguish the kind of the operation and the attribute in the detected drawing request in reference with the mapping table.

After that, the drawing request monitoring unit 102 has the similar operation as that of the first exemplary embodiment until acquiring the drawing result information (step S120-B shown in FIG. 2).

Next, the analysis unit 108 analyzes the drawing information (step S122-B shown in FIG. 2). According to this embodiment, the analysis unit 108 classifies the drawing request order information for each case and calculates the drawing inconvenience probability.

The operation of the analysis unit 108 in this time will be described in detail with reference to FIG. 11.

First, the analysis unit 108 reads the former drawing test record from the data storage unit 104 (Step S402 shown in FIG. 11). Additionally, the information which becomes the input to the analysis unit 108 is a monitoring record which the drawing request monitoring unit 102 has recorded and drawing result information which the drawing result acquisition unit 106 has acquired.

Next, the analysis unit 108 classifies the drawing request order information for each case (Step S404 shown in FIG. 11). The case is classified for each setting of the synchronization/asynchronization at the time of the each block execution and the contents of the drawing request. For example, Case 1 is the synchronization setting at the time of each block execution, and the drawing request content makes it the order of the creation→the body arrangement. Case 2 is the asynchronous setting at the time of each block execution, and the drawing request content makes it the order of the creation→body arrangement. In this case, the information which specifies the location of the script corresponding to the case which the data storage unit 104 holds is the object of the drawing request, the order information and the information on the synchronization/asynchronization setting at the time of each block execution.

Next, the analysis unit 108 checks the presence of the drawing inconvenience occurrence (Step S406 shown in FIG. 11).

If the drawing inconvenience does not occur, the processing is advanced to Step S412 shown in FIG. 11.

If the drawing inconvenience occurs, the drawing request order is calculated in addition to the identifier of the drawing inconvenience object and the drawing request order information which has operated the object by using the drawing result information and the monitoring record (Step S408 shown in FIG. 11).

And 1 is added to the number of the occurrence times of the drawing inconveniences in a case that the drawing inconvenience has occurred in the above-mentioned drawing test record so far by using the extraction result of the case (Step S410 shown in FIG. 11).

Next, the analysis unit 108 adds 1 to the number of the execution times concerning to all cases included in the above-mentioned monitoring record (Step S412 shown in FIG. 11).

In this case, when there are the drawing object, the drawing request order and the case which are not included in the drawing test record, the analysis unit 108 adds the drawing test record as a new item.

After that, in all cases that the number of the execution times is updated or added, the analysis unit 108 calculates the occurrence probability of the drawing inconvenience (Step S414 shown in FIG. 11).

For example, in one Web content indication, if there exists three drawing request order in formations which come under a specific case and the drawing inconvenience occurs in one execution order out of them, 3 is added to the number of execution times of the case, 1 is added to the number of the occurrence times of the drawing inconvenience, and the occurrence probability of drawing inconvenience is calculated. That is, the analysis unit 108 carries out the case 3 times and regards that the drawing inconvenience has occurred once in the one time drawing test.

And the analysis unit 108 reflects the analysis result in the data storage unit 104 (Step S416 shown in FIG. 11 and Step S124 shown in FIG. 2-B).

Finally, the analysis result indication unit 110 shows the analysis result of the drawing inconvenience to the drawing examiner 400 using the monitoring record of the drawing request monitoring unit 102 and the latest drawing test record of the data storage unit 104 (step S126-B shown in FIG. 2).

In the presentation of the analysis result of the drawing inconvenience, when the description of the probabilistic re-drawing processing is inserted in the script 302, the data storage unit 104 investigates each relevant location based on the drawing request order information and the contents of the contrast information and the case, and inserts the description of the probabilistic re-drawing processing. At that time, although included in the case which has become the result indication object, the description of probabilistic re-drawing processing to the script may be inserted to the request order information which has not carried out in this test.

Further, by other additional information included in a monitoring record, the analysis result indication unit 110 may be changed the method to insert description of probabilistic re-drawing in a script 302. For example, according to the load of the Web content 300 at the time of the drawing processing, the execution probability of the re-drawing in the inserted probabilistic re-drawing processing may be adjusted. That is, it may be applicable to make the probability of re-drawing lower than a standard probability (probability to be applied when a load is not high) if the load such as the CPU utilization rate in the browser execution environment is high, while it may be applicable to make the probability of re-drawing higher than the standard probability if the load is low, conversely.

As it has been described above, this embodiment has an effect that the drawing test result which has been obtained before can still be reflected for the Web content which has performed the drawing test in the past.

A reason is that the analysis unit 108 calculates the occurrence probability of the drawing inconvenience for each case with the same tendency of the feature of the contents. Therefore, it is because that the analysis result indication unit 110 can embed the processing to perform the re-drawing corresponding to the occurrence probability of the drawing inconvenience, for a drawing request processing part that is included in the case that the drawing inconvenience occurrence probability has changed at this test in the script which has performed drawing test in the past.

Fourth Exemplary Embodiment

Figure 12:
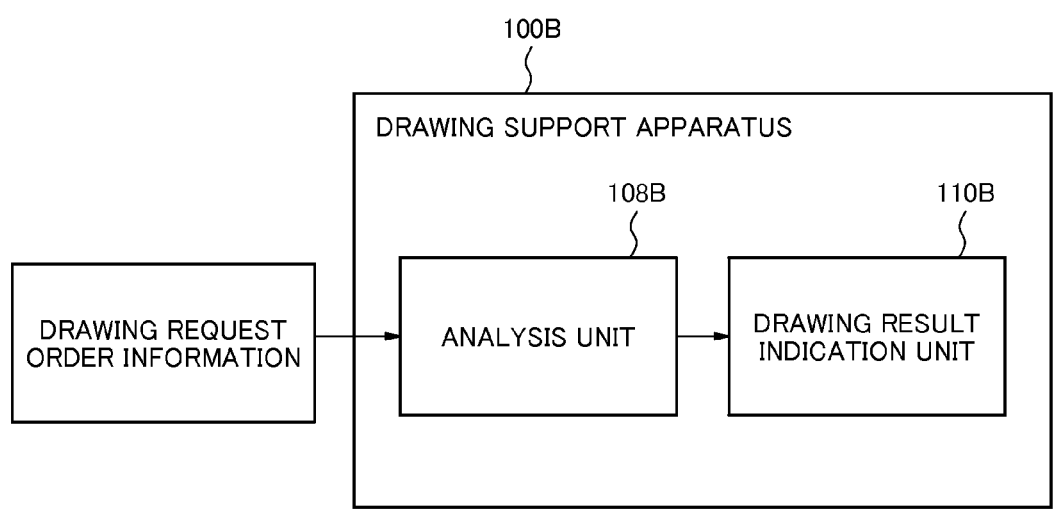
FIG. 12 is a block diagram which shows a fourth exemplary embodiment of the present invention.

FIG. 12 is a block diagram which shows a configuration of a drawing support apparatus 100B according to the fourth exemplary embodiment of the present invention. The drawing support apparatus 100B according to this embodiment includes an analysis unit 108B and a drawing result display unit 110B.

In the drawing support apparatus 100B, the analysis unit 108B calculates an occurrence probability of the drawing inconvenience for the each drawing request order based on the drawing request order information representing the drawing request order given from an out side or an external apparatus that monitors the drawing request to a browser. Next, the drawing result unit display 110B shows the drawing inconvenience occurrence probability that the analysis unit 108B has calculated to the user (drawing examiner).

According to drawing support apparatus 100B according to this embodiment, a development and a creation of the Web content can be efficiently carried out which performs the redrawing processing corresponding to a difference of the occurrence probability of the drawing inconvenience of the each drawing execution order for the Web browser having a possibility that the next drawing request catches up the present drawing processing.

The present invention is not limited to the exemplary embodiment described above, and the various modifications are applicable for its implementation.

1 CPU
 10 Computer.
 11 Memory.
 12 HDD
 13 Drive apparatus.
 14 Memory storage.
 15 Bus.
 100 Drawing support apparatus.
 100A Drawing support apparatus.
 100B Drawing support apparatus.
 102 Drawing request monitoring unit.
 102A Drawing request monitoring unit.
 104 Data storage.
 106 Drawing result acquisition unit.
 108 Analysis unit.
 108B Analysis unit.
 110 Analysis result indication unit.
 110B Analysis result indication unit.
 112 Web content management unit.
 114 Web server.
 116 Web content with a log function.
 118 Script with a log function.
 200 Browser.
 202 Drawing demand accepting unit.
 204 Drawing processing unit.
 300 Web content.
 302 Script.
 310 Block indicating a processing flow.
 312 Drawing object element ("div" element).
 314 Function.
 316 Identification information (value of id attribute) of an element.
 318 CreateDivElement block
 320 PlaceDivElement block
 320A PlaceDivElement block after drawing inconvenience correspondence.
 322 CreateImgElement block
 324 PlaceImgElement block
 324A PlaceImgElement block after drawing inconvenience correspondence.
 326 Probabilistic re-drawing processing body.
 328 Probabilistic re-drawing processing 40%.
 330 Probabilistic re-drawing preprocessing 0%.
 400 Drawing examiner
 402 Drawing result checking system.
 500 Network.

The invention claimed is:

1. A drawing support apparatus comprising:
a CPU; and
a non-transitory computer readable recording medium storing a program;
wherein the program causes the CPU to carry out processes of:
calculating a drawing inconvenience occurrence probability, based on a drawing request order information representing a drawing request order given from an out side or an external apparatus which monitors a drawing request for a browser, for each of the drawing request order; and
indicating the drawing inconvenience occurrence probability calculated by the analysis unit.

2. The drawing support apparatus according to claim 1, wherein
the drawing result indication unit inserts, into a location that the drawing request order information indicates a Web content as a drawing test object, a description representing a probabilistic re-drawing processing that performs a re-drawing processing in accordance with the drawing inconvenience probability, which is given as an argument, based on a calculated proportion of the drawing inconvenience occurrence probability.

3. The drawing support apparatus according to claim 1, wherein
the drawing request order information includes an attached information representing at least any one of an attribute of the drawing request and a load status under execution,
the analysis unit classifies the drawing request order information into a plurality of cases based on a common point of the attached information and calculates the drawing inconvenience occurrence probability for each of the case, and
the drawing result indication unit shows the drawing inconvenience occurrence probability for each of the case.

4. The drawing support apparatus according to claim 3, wherein
the drawing result indication unit inserts a description representing a probabilistic re-drawing processing in accordance with the calculated drawing inconvenience occurrence probability into a location where the each drawing request order information is classified into the same case in the Web content as the drawing test object.

5. The drawing support apparatus according to claim 1, wherein
the drawing result indication unit inserts a description representing the probabilistic re-drawing processing in an insertion method of a processing based on a specific condition.

6. The drawing support apparatus according to claim 1, wherein
the drawing result indication unit adjusts a re-drawing execution probability in a probabilistic re-drawing processing that is inserted in a Web content as a drawing test object by at least any one of an execution situation of drawing the Web content and a set condition.

7. A drawing support method comprising:
calculating a drawing inconvenience occurrence probability, based on a drawing request order information representing a drawing request order given from an out side or an external apparatus which monitors a drawing request for a browser, for each of the drawing request order; and
indicating the drawing inconvenience occurrence probability calculated in the calculating.

8. The drawing support method according to claim 7, wherein
In the indicating the drawing inconvenience occurrence probability, a description representing a probabilistic re-drawing processing that performs a re-drawing processing in accordance with the drawing inconvenience probability, which is given as an argument, based on a calculated proportion of the drawing inconvenience occurrence probability is inserted into a location that the drawing request order information indicates a Web content as a drawing test object.

9. The drawing support method according to claim 7, wherein
the drawing request order information includes an attached information representing at least any one of an attribute of the drawing request and a load status under execution,
in the calculating the drawing inconvenience occurrence probability, the drawing request order information into a plurality of cases is classified based on a common point of the attached information and the drawing inconvenience occurrence probability is calculated for each of the case, and
in the indicating the drawing inconvenience occurrence probability, the drawing inconvenience occurrence probability is indicated for each of the case.

10. The drawing support method according to claim 7, wherein
in the indicating the drawing inconvenience occurrence probability, a description representing a probabilistic re-drawing processing in accordance with the calculated drawing inconvenience occurrence probability is inserted into a location where the each drawing request order information is classified into the same case in the Web content as the drawing test object.

11. The drawing support method according to claim 7, wherein
in the indicating the drawing inconvenience occurrence probability, a description representing the probabilistic re-drawing processing is inserted in an insertion method of a processing based on a specific condition.

12. The drawing support method according to claim 7, wherein
in the indicating the drawing inconvenience occurrence probability, a re-drawing execution probability in a probabilistic re-drawing processing that is inserted in a Web content as a drawing test object is adjusted by at least any one of an execution situation of drawing the Web content and a set condition.

13. A non-transitory readable storage medium storing a drawing support program enables a computer to implement:
an analysis processing to calculate a drawing inconvenience occurrence probability, based on a drawing request order information representing a drawing request order given from an out side or an external apparatus which monitors a drawing request for a browser, for each of the drawing request order; and
a drawing result indication processing to indicate the drawing inconvenience occurrence probability calculated by the analysis processing.

14. The non-transitory readable storage medium according to claim 13, wherein
the drawing result indication processing inserts, into a location that the drawing request order information indicates a Web content as a drawing test object, a description representing a probabilistic re-drawing processing that performs a re-drawing processing in accordance with the drawing inconvenience probability, which is given as an argument, based on a calculated proportion of the drawing inconvenience occurrence probability.

15. The non-transitory readable storage medium according to claim 13, wherein
the drawing request order information includes an attached information representing at least any one of an attribute of the drawing request and a load status under execution,
the analysis process classifies the drawing request order information into a plurality of cases based on a common point of the attached information and calculates the drawing inconvenience occurrence probability for each of the case, and
the drawing result indication process shows the drawing inconvenience occurrence probability for each of the case.

16. The non-transitory readable storage medium according to claim 13, wherein
the drawing result indication process inserts a description representing a probabilistic re-drawing processing in accordance with the calculated drawing inconvenience occurrence probability into a location where the each drawing request order information is classified into the same case in the Web content as the drawing test object.

17. The non-transitory readable storage medium according to claim 13, wherein
the drawing result indication process inserts a description representing the probabilistic re-drawing processing in an insertion method of a processing based on a specific condition.

18. The non-transitory readable storage medium according to claim 13, wherein
the drawing result indication process adjusts a re-drawing execution probability in a probabilistic re-drawing processing that is inserted in a Web content as a drawing test object by at least any one of an execution situation of drawing the Web content and a set condition.

* * * * *